US012731045B2

(12) United States Patent
Banks et al.

(10) Patent No.: US 12,731,045 B2
(45) Date of Patent: Sep. 8, 2026

(54) AUTOMATED CONTENT MANAGEMENT IN COMPUTER APPLICATIONS WITH FOCUS MODE

(71) Applicant: Microsoft Technology Licensing, LLC, Redmond, WA (US)

(72) Inventors: Richard Malcolm Banks, Chertsey (GB); Siân Elizabeth Lindley, Cambridge (GB); Eva Britta Karolina Burlin, Cambridge (GB); Max Jan Meijer, Atlanta, GA (US); John Michael Winn, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 613 days.

(21) Appl. No.: 18/209,949

(22) Filed: Jun. 14, 2023

(65) Prior Publication Data

US 2024/0419984 A1 Dec. 19, 2024

(51) Int. Cl.
*G06N 5/022* (2023.01)

(52) U.S. Cl.
CPC .................................... *G06N 5/022* (2013.01)

(58) Field of Classification Search
CPC ......... G06N 5/022; G06N 20/00; G06F 9/542
USPC ............................................................ 706/45
See application file for complete search history.

(56) References Cited

U.S. PATENT DOCUMENTS

2016/0034560 A1* 2/2016 Setayesh ............... G06F 40/169 707/739
2019/0012591 A1* 1/2019 Limsopatham ........ G06N 3/042
2019/0266240 A1* 8/2019 Georges ................ G06F 40/289
2021/0382950 A1 12/2021 Arnold et al.
2021/0389999 A1* 12/2021 Malireddi ............ G06F 9/4831

OTHER PUBLICATIONS

International Search Report and Written Opinion received for PCT Application No. PCT/US2024/032177, Nov. 18, 2022, 20 pages.
Invitation to pay additional fees received for PCT Application No. PCT/US2024/032177, Sep. 27, 2024, 11 pages.
"Artificial Intelligence Solutions for Document Classification", Retrieved from: https://www.abbyy.com/blog/ai-solutions-for-document-processing/, May 14, 2021, 12 Pages.
"Document AI (Intelligent Document Processing)", Retrieved from: https://www.microsoft.com/en-us/research/project/document-ai/, Retrieved Date: Oct. 14, 2022, 2 Pages.

(Continued)

*Primary Examiner* — Usman A Khan
(74) *Attorney, Agent, or Firm* — Schwegman Lundberg & Woessner, P.A.

(57) ABSTRACT

A computer-implemented method comprising detecting, by an application in a focussed operating mode, a trigger event; determining, using machine learning (ML) content classification applied to content associated with the trigger event, that content associated with the trigger event does not match a permitted topic associated with the focussed operating mode; and based on determining that the second content does not match the permitted topic applicable to the focussed operating mode, suppressing, by the application in the focussed operating mode, notification of the second trigger event.

19 Claims, 10 Drawing Sheets

(56) References Cited

OTHER PUBLICATIONS

"Find and replace text across multiple Illustrator files", Retrieved from: https://community.adobe.com/t5/illustrator-discussions/find-and-replace-text-across-multiple-illustrator-files/td-p/9886883, Apr. 27, 2018, 16 Pages.
"Manage notifications in Teams", Retrieved from: https://support.microsoft.com/en-US/office/manage-notifications-in-teams-1cc31834-5fe5-412b-8edb-43fecc78413d, Retrieved Date: Oct. 14, 2022, 7 Pages.
"Rewrite Any Content In Seconds With Ai", Retrieved from: https://copymatic.ai/ai-rewriting-tool/, Retrieved Date: Oct. 14, 2022, 5 Pages.
"Search and Filter Messages", Retrieved from: https://support.microsoft.com/en-US/office/search-and-filter-messages-31682332-4dba-42e5-9e3b-bf7dd178d106, Retrieved Date: Oct. 14, 2022, 4 Pages.
"Set the custom Focusing status in Microsoft Teams from To Do using Power Automate", Retrieved from: https://msunified.net/2020/10/04/set-the-custom-focusing-status-in-microsoft-teams-from-to-do-using-power-automate/, Oct. 4, 2020, 8 Pages.
"Use Focus on your iPhone or iPad", Retrieved From: https://support.apple.com/en-us/HT212608, Jan. 9, 2023, 6 Pages.
Bohon, Cory, "How to use Focus Filters in iOS 16 to limit distractions", Retrieved from: https://www.techrepublic.com/article/use-focus-filters-ios/, Jul. 21, 2022, 6 Pages.
Potuck, Michael, "Here's how the new iPhone Focus mode works in iOS 15", Retrieved from: https://9to5mac.com/2021/11/09/how-to-use-iphone-focus-mode-ios-15/, Nov. 9, 2021, 11 Pages.
Tsuei, Judy, "11 best focus apps in 2023", Retrieved from: https://www.getclockwise.com/blog/best-focus-apps, Retrieved Date: Oct. 14, 2022, 8 Pages.
Wilkins, et al., "Designing AI Systems that make Organizational Knowledge Actionable", In Journal of Interactions, vol. 27, Issue 6, Nov. 2020, pp. 72-75.
Winn, et al., "Alexandria: Unsupervised High-Precision Knowledge Base Construction using a Probabilistic Program", In Proceedings of 1st Conference on Automated Knowledge Base Construction, May 20, 2019, 20 Pages.
Winn, et al., "Enterprise Alexandria: Online High-Precision Enterprise Knowledge Base Construction with Typed Entities", In Proceedings of 3rd Conference on Automated Knowledge Base Construction, Oct. 2021, pp. 1-13.
International Preliminary Report on Patentability (Chapter I) received for PCT Application No. PCT/US2024/032177, Mailed on Dec. 26, 2025, 13 Pages.

* cited by examiner

300
Project
304a
Project Lead
304b
Project Name
304c
Meeting
302a
302b
302c
302d

Application 2

704

716

Content exchange

Application 1

Date

702

712

AUTOMATED CONTENT MANAGEMENT IN COMPUTER APPLICATIONS WITH FOCUS MODE

BACKGROUND

Certain productivity applications (such as email and messaging applications) are equipped with a 'focus' mode, in which notifications of incoming messages are suppressed. For example, a mode may be provided within an application which can be selected by the user to block notifications of all incoming messages and/or other events that would trigger a notification outside of the focus mode. For example, certain email applications (e.g. email, messaging etc.) allow a user to specify in advance time periods in which the focus mode is engaged. In some cases, a user may be able to define exceptions, such as a specified 'white listed' user identity (or identities) for which notifications are not suppressed even in the focus mode.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

Described herein are system and methods for filtering out content not associated with a permitted topic from output to a user interface and for exchanging content between different content sources, such as documents, emails, etc. Within a focus mode, messages and notifications may be filtered to limit to those determined to be related to a permitted topic. Focus mode may be applied to multiple applications simultaneously to filter content from multiple active interfaces. As well as filtering data, the methods described herein may be applied to automatically identify and exchange corresponding content between multiple content sources, which may be associated with different applications.

BRIEF DESCRIPTION OF THE DRAWINGS

To assist understanding of the present disclosure and to show how embodiments may be put into effect, reference is made by way of example to the accompanying drawings in which:

FIG. 8 is a schematic block diagram showing the automatic exchange of content between multiple applications;

DETAILED DESCRIPTION OF EMBODIMENTS

Figure 1:
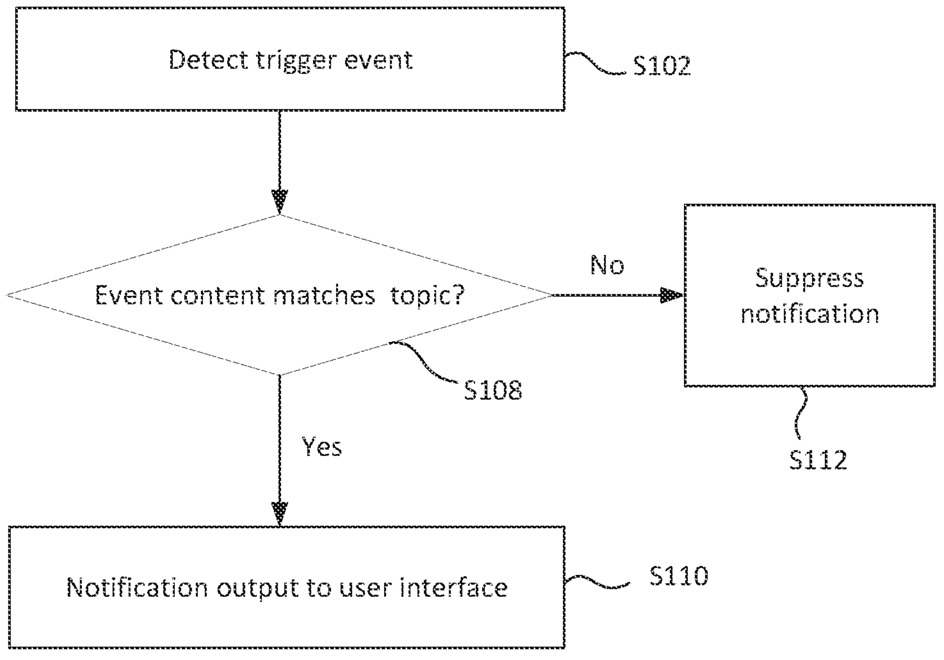
FIG. 1 is a flow chart of a data control method for filtering data output to a user.

Existing methods of filtering content to be displayed via a user interface are typically applied at the application or tool level, or at the system level. For example, no notifications for any applications are displayed in the user interface while a word processing application is used in a full-screen mode, thus applying a general notification filter to the word application only. Alternatively, at the system level, a user may select a time period during which all notifications are turned off, and no notifications (including emails, messages, etc.) are displayed within any applications of the system during this time. However, the user may instead wish to allow only certain notifications to be displayed while they work on a specific project, or while they work with a specific organisation. Notifications relating to the user's current activity should be displayed, such that the user can receive up-to-date information about their current activity, while notifications unrelated to the user's current activity are suppressed, to avoid distraction of the user from their current task. The methods described herein are applied across multiple applications, such that the user can specify a topic and a time period over which the focus mode is active, and switch freely between applications, with notifications that are unrelated to the specified topic being blocked within the multiple applications over which the focus mode is active. Topics can be specified by the user via a user interface of a user application, such as a calendar application. The user can also activate the focus mode via a user control provided within the user interface of the application. The user can therefore control the notifications received during a specified time or calendar event via the calendar application, with the notification control being applied across multiple applications.

Described herein is a method of selectively suppressing incoming notifications and messages to user applications according to a specified topic when a focus mode is selected. For example, when a user is working on a specific project, and wishes to prevent notifications being shown while working on that project in any relevant applications. To do this, the user can activate a focus mode in an application or across multiple applications, and specify a 'topic', such as the current project that the user is working on, based on which notifications are selectively suppressed. While the focus mode is active in a given application, any content, such as email and message notifications for display to the user via the given application, are then analysed to determine if they are associated with the topic specified by the user. This provides the user with greater control over the settings of the user interface, while requiring minimal input from the user to control the user interface contents. Furthermore, suppressing unrelated content can save computing resources which would ordinarily be used to output notifications relating to the unrelated content.

As well as filtering incoming notifications, including incoming emails and messages, the methods described herein can be used to filter the content and actions provided to the user while in a focus mode, based on a selected topic. In conventional implementations of a focus mode, such as using a particular application in a full-screen mode, the user is discouraged from taking any action outside of the user's current activity, such as sending messages to people. However, in the content filtering system described herein, the actions available to the user via content of the user interface is selected according to the specified topic. This enables a user to message another user that is connected to the topic while in focus mode, for example to discuss the user's work within that topic, while still suppressing actions associated with users, documents, or other entities that are determined to be unrelated to the specified topic.

In addition to filtering content, methods are described herein for automatically identifying related content from different content sources, and exchanging data between content sources when matching data fields are found. Conventionally, when a user opens or receives a content source (such as an email) within its associated application, the user is required to parse the information contained in it to determine whether this can be used to update a different content source (such as a text document the user is working on). By automatically identifying when two content sources contain corresponding data fields, the actions required by a user when a new email containing, for example, instructions to update a date within a document, are simplified, since the email can be analysed to automatically identify the new date, determine that it corresponds to an existing date field of the document, and automatically modify the date field within that document.

When the content filtering and automatic content exchange methods are used in combination, this can lead to reduced computing resources, since the content exchange analysis is applied to content sources which have already been identified as being related to a specified topic, avoiding the need to analyse unrelated content sources for possible matches.

Applications for which a focus mode is activated apply this content filtering to newly received data by detecting 'trigger' events, i.e. events that would, in a normal mode of operation, cause a notification to be displayed at the user interface. Trigger events could include new incoming messages or emails being received, based on which a notification would, in a normal mode, be output to a user interface. While in a focus mode, the application (e.g. the email application) analyses the content associated with the trigger event to determine if it matches a permitted topic associated with the focus mode, outputting the notification only if the content matches the permitted topic.

A structured knowledge base is used to identify whether a given notification relating to an event such as a message or an email relates to a selected topic. A structured knowledge base may be provided in the form of a graph comprising nodes representing entities such as users, documents, files, applications, etc., and edges between nodes encoding the relationships between the entities. Alternatively, the knowledge base may be provided in an object-oriented format, where entities are represented as objects, which are instances of an object class, each object class corresponding to a type of entity. For example a document entity is represented by one object class, while a user is represented by a different object class. An object class is defined with an entity property or properties, and each instance of that class (object) assigns property value(s) to the property (or properties). Property values could themselves be objects (such as users or documents) or text (such as the name of a topic object) or data types (such as a date, or location). The methods described below are not limited to any specific implementation of the knowledge base, and other forms of knowledge base may be used with the filtering techniques described further herein.

Within the structured knowledge base, different topics are defined such that a specified topic can be used to identify a group of properties within the structured knowledge base that relate to that topic. When a user selects a topic as part of the content control method described herein, the entity and associated properties of the structured knowledge base for that topic is then used to determine which data can be output to the user via the user interface. An output view may be generated and automatically populated by data of the identified group of properties, with any properties falling outside the identified group of properties being excluded from the output view.

When the focus mode is active within an application or multiple applications, and while the user is engaging with the user interface within the specified topic, any external content that is received for output to the user interface, such as email notifications, messages, alerts, etc., is checked for its association with the existing group of entities identified for the given topic. If it is associated with the given topic, it is output to the user interface, while if it is not associated with the given topic, it is suppressed and not output to the user interface. Content items that are determined to be related to the specified topic, and therefore output via the user interface, may also be analysed for relevant content that can be integrated into existing documents or other entities of the knowledge base that are already determined to be associated with the specified topic. This allows automatic content exchange and integration between different content items within the same topic.

Suppressed content can be stored and displayed at some later time when the mode is not active. The user may 'deactivate' the focus mode manually, or the data control may be time-limited based on a time period specified by the user or determined automatically based on a user's activity, for example using a machine learning model.

The use of a structured knowledge base to provide content for output to a user interface based on a topic specified by a user allows the user to access data from various sources in a single interface without having to manually open multiple applications and search for relevant information, thus simplifying the actions required for the user to access the relevant data. For example, where the user specifies a given project 'Project Alpha' as the topic for a specified time (such as one hour), the data control method provides the user with data already known to relate to that project, including relevant users, documents and other files, based on the structured knowledge base, and updates the user interface if more data, such as emails or notifications, are received relating to that project, while suppressing any notifications which are unrelated to the specified project. Furthermore, the data control is not limited to any single tool or application, allowing the user to switch between multiple applications, with each application providing a controlled interface having only data relating to the specified topic, and suppressing any incoming data that is not associated with the specified topic.

It should be noted that the structured knowledge base and the definition of topics may be implemented at the network level, by defining a single knowledge base across an entire organisation, incorporating shared information from the multiple users within the organisation along with information from other data sources, such as public data sources on the web or shared resources of the organisation. Alternatively, the structured knowledge base may be defined on the user level, with each user of the network having a personal view of the knowledge base, each user's personal view of the knowledge base using both personal data specific to their user accounts (including, for example, emails, personal appointments, and messages) as well as information shared across the organisation that the given user has permission to access.

The filtering of incoming notifications is described below with reference to claim 1. This description relates to the processing of notifications received while a focus mode is active. However, as described further herein, the same techniques can be applied to filter content already present within an application upon activation of a focus mode. This is described in further detail with reference to FIGS. 6-7.

FIG. 1 shows a flow diagram of a notification control method implemented by a computer application, such as an email or messaging application, for filtering notifications to be output to a user via a user interface. The computer system on which the filtering method described below is implemented may be the same computer system on which the user interface is implemented, or alternatively, the filtering method may be provided as part of a distributed computer system having multiple user devices connected to a server on which the filtering system is implemented. The filtering system may be implemented as a cloud service on a cloud computing platform to which user devices are connected. In the present example, the filtering system is provided as a cloud-based service for implementation on a network comprising multiple user devices, such as an enterprise network belonging to a single organisation, each user device having multiple applications connected to the cloud-based filtering service. Applications of the user devices may be connected to the cloud-based server to access the knowledge base in order to implement the filtering methods described herein at the level of each application for which the topic-based filtering is applied.

An input is received from a user, to specify a topic based on which the data is filtered. The input is typically provided by a user via a user control of the user interface. For example, where the user is using an email application, a control may be provided within the user interface of the email application that allows the user to either select or input a topic (or a set of multiple topics) based on which data displayed to the user can be filtered. In one example, a dropdown box may be provided, showing a number of existing topics (as determined from the structured knowledge base, described in further detail below) from which the user can select. In another example, a text box may be provided, in which the user can enter the name or another identifier of a topic. In this case, an autocomplete function may be provided to suggest existing topics determined from the structured knowledge base based on the user's partial input.

The term 'topic' as used herein defines an entity within the structured knowledge base, which has a number of associated properties, which include further entities as well as other types of data such as text, dates, locations, etc., described in more detail below. For example, one topic could be a work project or subject area of interest to the user. Other examples of topics include events or organisations. A topic is itself an entity, i.e. one entity of the knowledge base may be an entity of type 'project', with the name 'Project Alpha', which, as mentioned above, is associated with a set of properties defined for project entities, such as 'project lead'. The properties of the topic entity correspond to a set of entities having a structural relationship with the topic entity within the knowledge base. For example, documents, users and calendar events which are associated with the example project 'Project Alpha' form a group of associated entities for that project. More details on the identification and linking of entities within the knowledge base are provided below with reference to FIG. 3.

At step S102, a trigger event is identified by a filtering system implemented within the application for which a focus mode is active on the network with a notification trigger for providing a notification to at least one user application on at least one user device of the network. For example, the trigger event could be an email received by a user account of the enterprise network, where receiving the email would, during normal operation, trigger a notification to be displayed on the user's desktop, as well as a notification in the form of new email to be displayed in a summary view within the user's inbox in an email application of the user's device. The filtering system is configured to detect emails as they are received and to identify whether the notification should be triggered. The data of the event is received by the filtering system before possibly being displayed to the user. It should be noted that the filtering of data to be displayed to the user via a user interface does not necessarily control the data being passed to the user device or user application. The purpose of the filtering system is to control what is provided to the user based on the user's specified topic, and not to control what is passed to the user device. Where the filtering system determines that the notification should not be triggered, the content associated with the trigger event, such as the email content of a new incoming email, is still received by the relevant user applications, and stored in a list or other data structure until such time as it can be displayed (for example once focus mode is deactivated). Events having notifications for display to the user may originate from sources external to the enterprise network, e.g. external emails, or data sources internal to the enterprise network, such as messages within an organisation via a messaging application.

The filtering system identifies when a focussed mode is currently active for the application to which a trigger event relates. Focus mode is triggered in each application by an 'activation event', which could be a user input, a time-triggered event, or an input received from a second application. As mentioned above, a user can select a focus mode within a user application, such as a calendar application, which can be applied to filter notifications across multiple applications of the user device. The user can specify a certain time period during which focus mode is active, for example by defining a calendar event and setting a 'focus mode' state for that calendar event, such that focus mode is active only for the duration of the event. A visual representation of the time interval ('focus interval') for which the focus mode is active is provided in the calendar view, for example as a 'block' within a timeslot of the calendar. Events for which focus mode is active may be visually distinguished from other events in the calendar representation, for example by colour or shading, etc. Focus mode may also be triggered in one application based on an input received from a second application. For example, a messaging application may activate focus mode based on an input from a connected email application that focus mode is activated within the email application. In the case that the focus mode is active for a predefined focus interval, the focus mode is automatically deactivated at the end of the focus interval.

Alternatively, the user may select a focus mode via a user control provided within the user interface of an application such as an email application, causing the focus mode to be activated until it is manually deactivated by the same user control or another user control provided in the user interface. The application detects a deactivation event, such as the end of the predefined focus interval, or a manual user action to deactivate the focus mode, and switches back to a normal mode of operation. The state of the 'controlled' or 'focus' mode (i.e. 'active' or 'inactive') is provided to the filtering system. If the focussed mode is inactive, the notification is triggered, since a normal mode of operation applies, and the notification is displayed within a user interface of the user device. For notifications received before a focus mode is activated, their content is still filtered from the user interface, as described below with reference to FIGS. 6 and 7.

If the focussed mode is active, the filtering system applies a check on the content associated with the trigger event to determine whether it should trigger a notification based on the topic specified by the user for which the focus mode is activated. This check can be performed by a trained machine learning model configured to process the trigger event and a topic entity having a set of multiple properties to determine its association with a topic. This is shown at step S108. This step is performed by comparing the event, such as an email or message received at the filtering system, to an existing set of entities stored in a knowledge base that are associated with the specified topic.

The content associated with the trigger event could include content of the event (for example the text of a received email, as well as associated metadata, such as the time the email was received, etc.) The extract creation step (S204) used to extract entities from data to be added to the knowledge base, as described below with reference to FIG. 3, may be used to extract entities and properties of the trigger event.

This comparison is done by computing an association probability for the event to determine the probability that that event is associated with the group of entities within the structured knowledge base. This uses a comparison of the properties of the event (for example, where the event is an email, this includes the sender of the email, the subject of the email, any other email addresses included on the email) with the properties (including entities and other data) and associated metadata of the selected topic. Using a probabilistic model, a probability value is computed for the event based on the comparison, representing the probability that the event is associated with the selected topic. A respective probability value may be computed between properties of the event and each property associated with the selected topic within the knowledge base, and a threshold applied to each computed probability to determine whether the content of the event should be output to the user.

While the description herein relates to probabilistic models, the analysis of the content associated with events to determine if it is associated with a topic may be performed by other types of model. In any case, a confidence score (also referred to herein as a property association score) is used to determine whether a property of a given event is associated with a topic. For example, a neural embedding may be used to represent properties of the knowledge base associated with a given topic, and similarly a neural embedding may be used to represent the properties of the event. In this case, a comparison between the event properties and the properties associated with the topic according to the knowledge base is performed by computing some similarity or distance measure, with the confidence score being based on this similarity or distance, such that content associated with a given event is only provided to the user interface if the property associated with the event is sufficiently similar or close to the existing properties of the knowledge base determined to be related to the topic. For example, where an incoming email has as a subject line 'Project Alpha', a feature embedding representing this property can be compared with a feature embedding of the property value 'Project Alpha' in the knowledge base corresponding, for example, to a property 'project name', which is associated with the topic, and the model may determine based on a distance between the feature embeddings that the email refers to the same 'project alpha' identified as related to the topic, and that the email is therefore related to the topic. Multiple properties of the email, such as the sender, contents, subject line, recipients, etc. may be compared with properties of the knowledge base, with separate confidence scores computed for each property. These confidence scores may be aggregated to determine an overall confidence score (e.g. probability) that the event is associated with the topic. As well as providing the event to the user interface, the event may be added as a property of the given topic within the knowledge base based on this analysis.

In addition to comparing the content associated with the trigger event to the properties identified as related to the topic selected by the user, the filtering system may also compare the event to the entities and other properties of any topics that are semantically similar to the topic selected by the user within the knowledge base. To determine which topics to include, a machine learning model may be applied to the topic selected by the user in order to identify other topics within the knowledge base that have similar meanings. The step of identifying matching entities is then also performed for those related topics, and a different (although possibly overlapping) set of properties is identified for each related topic. The step of computing the association probability between the event and the selected topic comprises determining an overall probability based on both the comparison of the content associated with the trigger event with the properties of the knowledge base identified in relation to the specific topic selected by the user, as well as the comparison of the event with the properties identified in relation to the semantically similar topics. The precise contribution of the different comparisons are determined by parameter values of the probabilistic model.

The filtering system checks if the computed confidence that the event is associated with the selected topic is at least as high as a predefined confidence threshold. The threshold may be configurable based on the required application. As mentioned above, the model used to perform this analysis to filter incoming trigger events for display in the user interface may also be used to add new data to the knowledge base as described in FIG. 3. However, in other embodiments, the knowledge base may be built and updated by one model, while new events are filtered by a different model that compares the event content with the existing knowledge base to determine its association with the topic. Both models may be probabilistic models that process the content to determine an association probability of the new data with the existing knowledge base. This would enable the display of content within a user interface in association with a topic to be based on a different level of confidence to that applied to the association of content with the topic within a knowledge base. For example, a given email may be determined to be sufficiently similar to properties of a topic within the knowledge base to display that email within a user interface of an email application during focus mode, but the same email may not meet the required association applied by the model that updates the knowledge base to add that email as a property of the given topic within the knowledge base.

If it is determined that the probability is greater than or equal to the predefined threshold, the notification associated with the trigger event is output to the user interface of any relevant applications and/or as a pop-up or desktop notification, providing the user with up-to-date information on the topic that the user has specified as relevant. Otherwise, the notification associated with the event is suppressed, i.e. not output to the user interface of any user application running on the user device. As mentioned above, the suppressed notification may still be provided to the user device and stored locally for display to a user at a later time when the filtering system is no longer actively controlling output to a user interface based on the given topic.

As mentioned above, the user may be using a particular application, such as an email application, through which the user specifies a topic based on which the output is filtered. The notification may be configured to be displayed within the same application and/or other applications of the user device. For example, generally when the user is using an email application on a user device, a new email that is received is configured to be displayed in a summary format (for example, displaying the sender's name, a subject line and at least a portion of the email contents) within the user interface of the email application within a display panel showing the user's inbox. Even if the relevant application for a given trigger event is not currently displayed by the user, some notifications may be displayed on the screen of a user device if the relevant application is open. For example, where the user is using a word processing application, while the email application is running in the background, and an email is received, a pop-up notification may appear on the user's screen showing summary information of the received email, which the user can click on to open the email within the email application.

It should be noted that other conditions may be applied by the filtering system to control the content output to the user interface. For example, the system may perform a check that the incoming trigger event is associated with a permitted user identity, and thus that the user has suitable access permissions for the content of the trigger event to be displayed to the user. This may be based on access information associated with the application and user account which is stored in memory on the cloud computing platform or other computer system on which the filtering system is implemented.

Multiple user applications can be linked to the filtering system, such that content filtering methods described below prevent a given notification from being displayed across all applications to which the filtering system is linked when it is determined that the trigger event does not relate to a selected topic. The filtering criteria, as defined by the topic specified by the user, is applied at the user level across these applications, such that a topic specified by the user, for example by selecting from a dropdown menu provided as part of an email application, can also be used to filter messages shown to the user in a separate messaging application.

Figure 2:
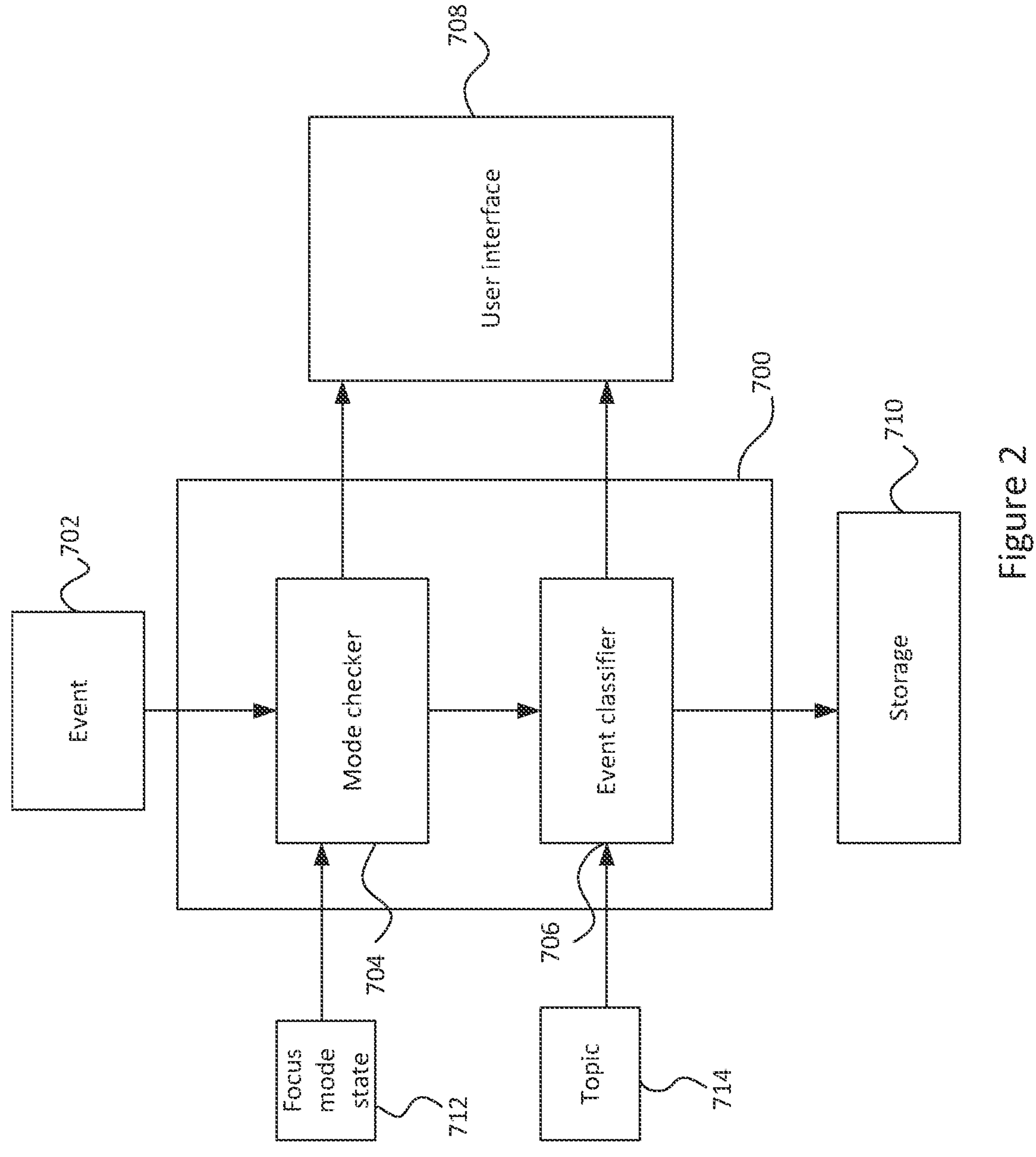
FIG. 2 is a schematic block diagram showing topic-based filtering of notifications by a filtering system.

FIG. 2 is a schematic block diagram showing topic-based filtering of notifications by a filtering system 700. The filtering system 700 is configured to receive trigger events 702 such as emails and messages before their associated notifications are displayed at the user interface 708 of a user device. A mode checker 704 within the filtering system is configured to receive a state 712 of the focus mode identifying whether the focus mode is active at the time that the event 702 is received. If the mode checker determines that the focus mode is inactive, the notification associated with the trigger event is passed straight to the user interface 708. If the mode checker 704 determines that the focus mode is active, the content associated with the trigger event is passed to an event classifier 706 which classifies the event in relation to the topic selected by the user. As with the focus mode state 712, the topic 714 selected by the user is provided to the filtering system when the user selects the topic via a given user application. The event classifier uses the topic to identify a set of topic properties within a structured knowledge base, which are compared with the data of the event to determine if the event is associated with the topic 714, as described above. If the event classifier 706 determines that the trigger event is associated with the topic 714 specified by the user, the notification associated with the trigger event is output to the user interface 708. If the event classifier 706 determines that the event is not associated with the selected topic, the notification associated with the event is output to storage 710 within the filtering system. If the focus mode state 712 is later updated, for example if a predefined time period for focus mode to be active expires, or if the user manually turns off focus mode, this updated focus mode state is passed to the mode checker, and the filtering system retrieves the event notifications held in storage 710 for output to the user interface 708.

Figure 3:
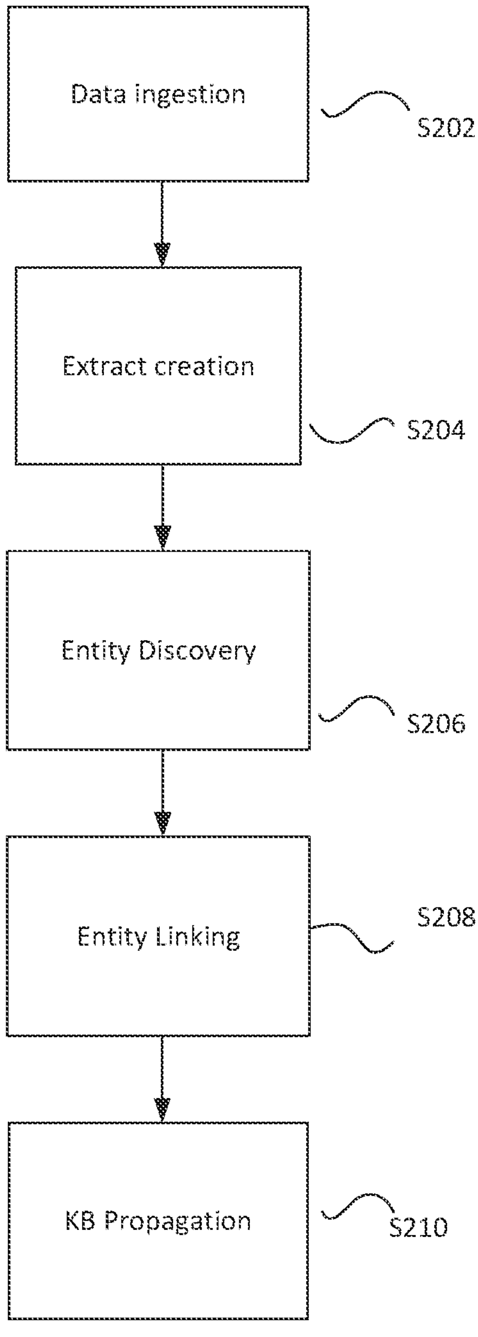
FIG. 3 is a flow chart of a method of creating a structured knowledge base.

The structured knowledge base, as mentioned above, is built by extracting information from a variety of data sources and identifying entities and their relationships to each other within the extracted information. This is illustrated in FIG. 3. The structured knowledge base is built using machine learning models to extract, parse and link information taken from unstructured data sources and incorporate the resulting entities to a structured data store. The component used to build the knowledge base may be referred to as the knowledge base builder. The building of a knowledge base may be performed iteratively, with an initial knowledge base being added to repeatedly as new data is received. The process of adding new data to an existing knowledge base is described below. As with the filtering system, the knowledge base builder may be implemented on a cloud server connected to multiple devices, or on a single computer system using data local to that computer system.

As shown in FIG. 3, data ingestion S202 is the first step taken in the building of the knowledge base. Data is ingested from a range of sources and comprises both structured and unstructured data, including text data from a variety of sources. For example, where the knowledge base is built on an enterprise network for use on that enterprise network, data may be ingested from shared resources on that network, such as file hosting applications, email servers, messaging apps, files of shared document management systems etc. as well as from public data sources such as text data from the web. Metadata is also ingested, specifying information such as authors, times, locations associated with the data from the various sources internal and external to the given computer system. As mentioned above, personalised knowledge bases may be built for individual users. In this case, the data ingestion step includes ingestion of user-specific data in addition to the shared network data and/or public data. In the case that personalised knowledge bases are generated, these may be built by first building a general network knowledge base based on shared or public data, and then updating the general network knowledge base to incorporate data specific to the given user.

The next step is extract creation S204. The knowledge base builder comprises a trained machine-learning based query engine which extracts data from each ingested document or file based on a computed probability that the data to be extracted contains knowledge that can be incorporated into the knowledge base. The query engine is trained to recognise and extract text and other types of data that appear to contain information about entities, including people, projects, dates, events, locations, times, etc. For example, where a given text document includes information about a certain project relevant to an organisation, 'Project Alpha', any phrases within that text referring to the (potential) entity of Project Alpha may be extracted. Similarly, any references to dates and names are likely to be extracted as potential entities. At this point, entities are not created, but snippets of text or other data that appear to refer to entities are extracted for processing at the next step, along with any metadata associated with the given document or file, such as the author of the file, the date of creation, etc.

Once the extracts containing references to potential entities are created, these are provided to a parser to identify entities and properties within the extracted data as part of an entity discovery step S106. The extract is used to then build confidence on whether the topic entity seems significant. The extract also provides a connection back to the data source (e.g. email, document) from which it came, relating that source to the topic within the knowledge base in the entity discover and knowledge base linking steps below. Extracting data therefore also associates the source object with the entity that's been created using the extract.

The parser may use probabilistic programming to identify entities within the unstructured text. One example probabilistic programming framework that can be used in the implementation of the parsing process is Infer.NET. The probabilistic parser works by identifying which parts of the extracted text snipped correspond to specific property values of an existing template, where templates are generated from structured and unstructured text using unsupervised learning. Thousands of templates may be learned and used with the probabilistic parser to identify entities and properties. An example template is 'Project {name} will be released on {date}', where 'name' and 'date' are properties of a 'project' entity type. Where the document contains the phrase 'Project Alpha will be released on Sep. 12, 2021', the probabilistic parser can easily identify the property 'name' with the word 'Alpha' and the property 'date' with the string 'Dec. 9, 2021'. Probability distributions are used to model uncertainty in the meaning of an extracted piece of text. When parsing the string 'Dec. 9, 2021' as a date entity, the parser cannot be certain of whether the date refers to the 12 September or the 9 December. In this case, the two possible dates are represented by a probability distribution based on the parser's predicted probabilities of each possible interpretation of the date string, therefore retaining both possible dates. Alternatively, property values may be extracted using other types of models to implement a parser that can process information and identify properties and entities from structured and/or unstructured text, such as GPT (Generative Pre-trained Transformer). These models and their application to language processing is well known in the field of machine learning and will not be described in detail herein.

In the probabilistic parsing example described above, the output of the parser is a probabilistic entity comprising a set of properties and distributions over the possible values of those properties. Each parsed extract generates one probabilistic entity, leading to multiple versions of the same entity being generated. These are then linked in the entity linking step S208 to resolve the multiple versions into a single entity. This process identifies duplicate entities and merges them using a clustering process. The clustering process uses a probabilistic program to link different instances of the same entity based on the probability that both instances refer to the same entity. The linking uses the distributions over the property values computed by the parser for two different instances, and calculates whether it is more likely that the distributions arose from a single underlying value or from two different values. In general, this analysis checks whether the properties identified for different entity instances are consistent or inconsistent with each other, taking uncertainty into account. For example, two entities extracted by the parser may be defined as follows:

{Name=Project Alpha, CompletionDate=September 2021}

{Name=Alpha, CompletionDate=12 September, Owner=Jane Smith}

The linking process may determine that there is a high probability that the distributions over the property values are likely to have arisen from the same underlying entity having the name 'Project Alpha' and a completion date of '12 Sep. 2021'. By resolving the two generated entities into a single entity, a more complete set of properties can be associated with the resulting entities based on the combined information from each individual instance. The same property may have multiple valid values that can be used to search for that property within the knowledge base. For example, "Project Alexandria" could have multiple "name" properties found through the extract creation process, such as simply "Alexandria". In this case the multiple names are associated with the property, and the user is allowed to use any as a way to search for the topic. The above is a simple example, and more complex merging can be performed where entity instances have more property values and more ambiguity within those property values. The linking process may also be used to correct errors within the data. For example, where most instances referring to a given project list the owner as 'Jane Smith', a separate instance having other properties consistent with the project entity but having an owner of 'Jay Smith' may be identified as the same entity. In this case, the linking process determines that the correct owner name is 'Jane' and the instance referring to 'Jay' contains an error.

Hundreds or thousands of instances created by the parser can be merged together to generate a realistic set of entities with more complete property information. In addition to unstructured text documents, the linking process can also analyse knowledge from other sources including structured data from databases, knowledge mining toolkits, and manually curated knowledge to generate complete entities.

The final step of the knowledge base building, knowledge base propagation (S210), comprises linking the identified entities to the existing knowledge base. This step again uses probabilistic programming to determine whether the entities identified in the previous step are the same as entities that already exist in the knowledge base. Where the knowledge base linking component of the knowledge base builder determines that a given entity generated from the ingested data according to steps S202-S208 has a high probability of being the same entity that already exists in the knowledge base, this entity is integrated into the knowledge base, and any additional properties provided in the received entity is also incorporated into the knowledge base.

Figure 4:
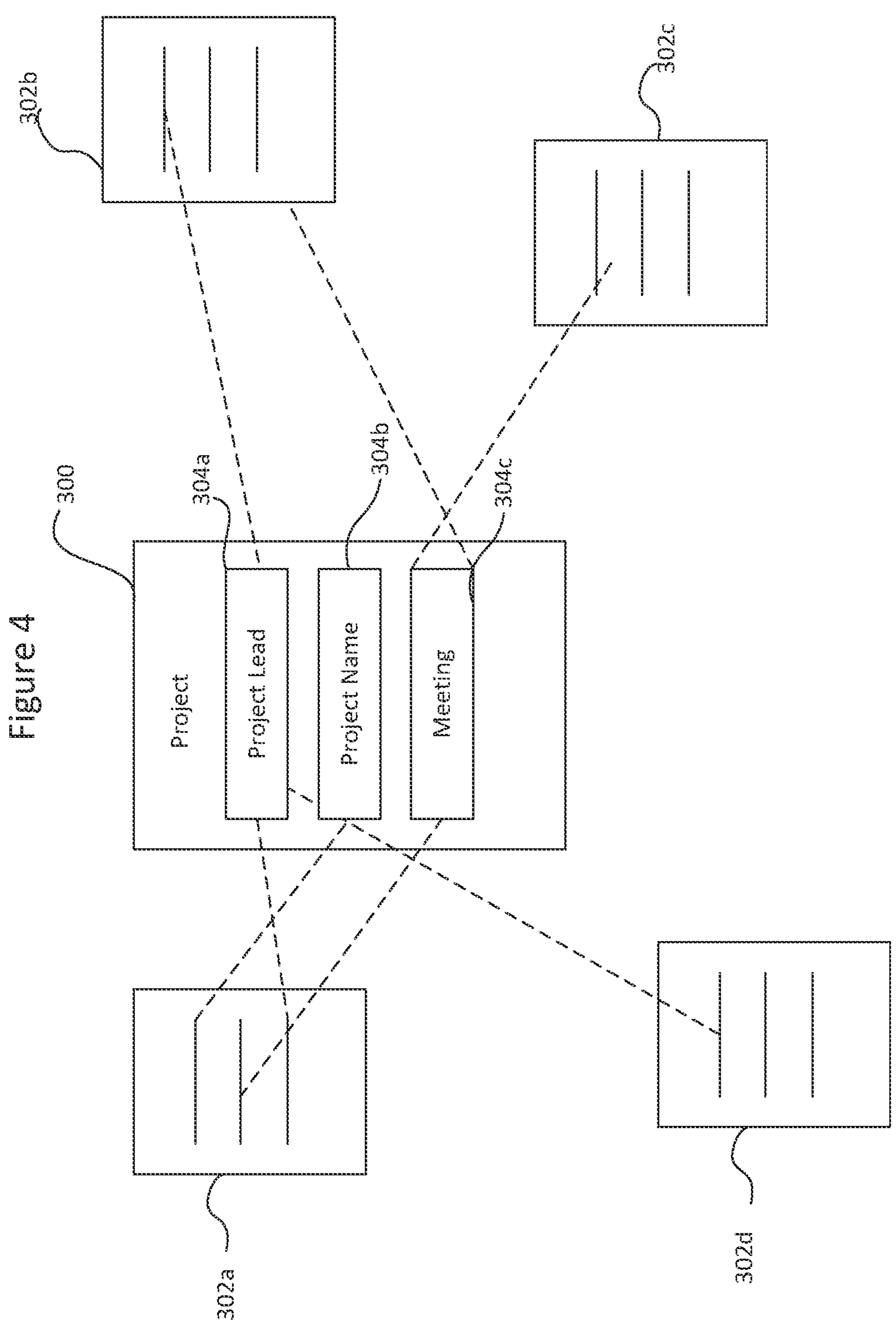
FIG. 4 is a schematic diagram showing the extraction of entities from unstructured text documents.

FIG. 4 shows how topic entities are built from extracts of multiple documents as described above. Multiple text data sources 202*a*-202*d* are shown, each comprising unstructured text data. In the extract creation step, snippets are extracted from each document that have a high probability of containing knowledge that can be incorporated into a structured knowledge base, and in the entity creation step these extracts are parsed and linked together to form single entities. In the example shown in FIG. 4, an example topic entity 300 for 'Project Alpha' is shown. The document 302*a* includes a snippet that is extracted that appears to correspond to a 'Project lead' property of the project entity as shown by the dotted line from the document 302*a* to the 'Project lead' property 304*a* of the topic entity 300 as well as a snippet corresponding to the 'Project Name' property 304*b* and a third snippet corresponding to the 'Meeting' property 304*c*. As mentioned above, properties can be entities or, for example, text data. In this example, the Project Lead property is itself a user entity representing a specific user identified as the lead of Project Alpha, and the 'Project Name' property is a text string such as 'Project Alpha'. As mentioned above, the knowledge base builder uses probabilistic programming to identify the properties of the potential entities based on a set of learned templates, and to merge duplicate instances of the same entity. The links from the unstructured text data extracted from the other documents 302*b*, 302*c*, 302*d* to the topic 300 having the 'Project Lead', 'Project Name' and 'Meeting' properties 304*a*, 304*b*, 304*c* are shown by dotted lines.

The simplified example shown in FIG. 4 shows a topic having multiple properties which are extracted from text documents 302 according to the methods described above with reference to FIG. 2. The 'meeting' property is resolved from the documents 302*b*, 302*c* and 302*a*. Properties of a meeting entity, such as a name, time, etc. are also extracted if this information present in the documents. Some properties of the meeting entity may relate to other entities. In this case, one of the extracts from the documents 302*b*, 302*a*, 302*c* identify the host of the meeting as a user for which an associated user entity can be defined. Thus, the relationships between entities are extracted along with the entities themselves based on the parsing and linking described above and represented by the nested structure of the entities in the knowledge base.

Figure 5:
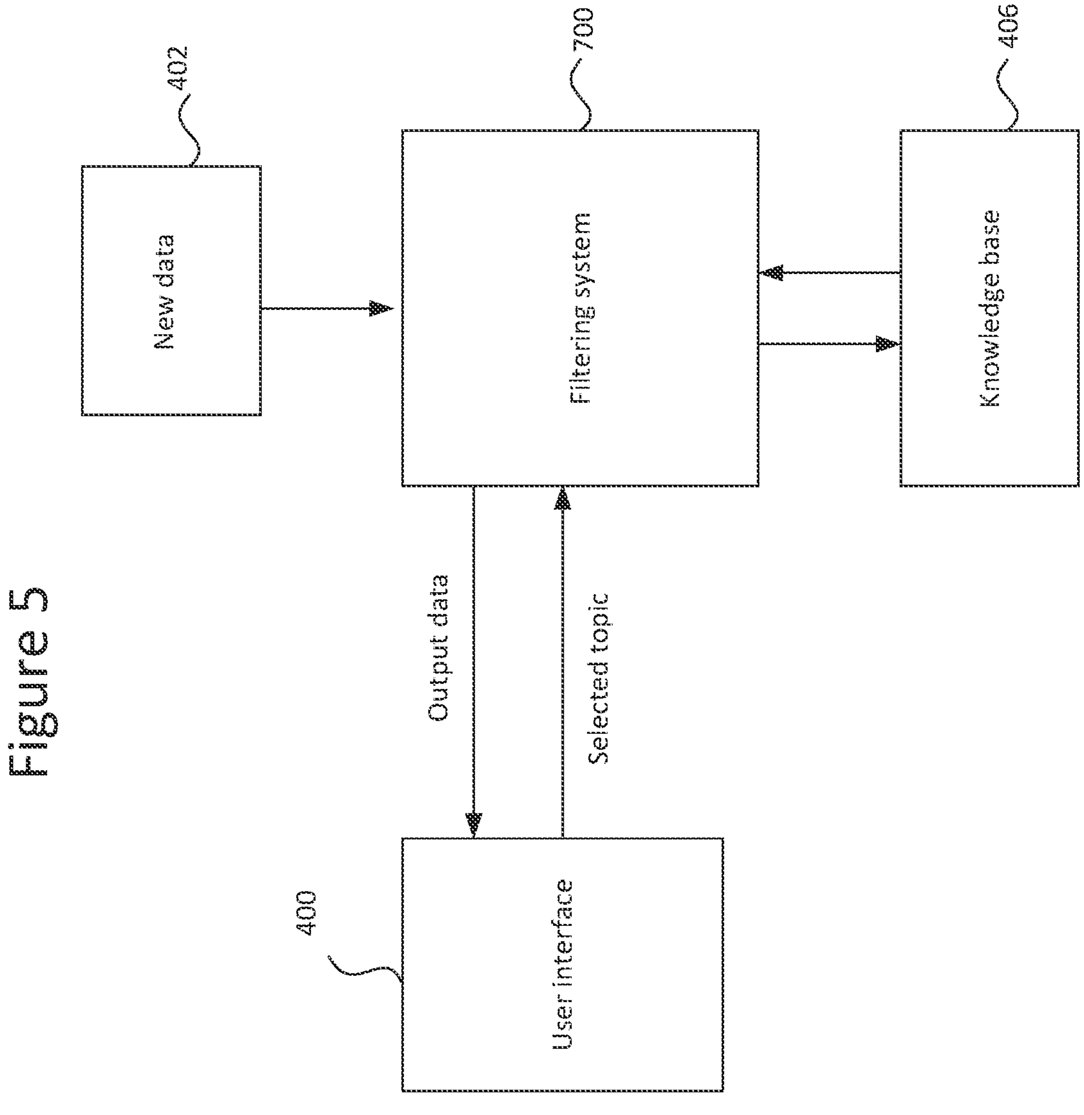
FIG. 5 is a schematic block diagram of a filtering data output to a user interface.

FIG. 5 shows how the filtering system 700 controls the output of data to a user interface based on the contents of a structured knowledge base. A user interface 708 is shown, which is provided to a user at a user device, such as a desktop computer, laptop or mobile device. As described above, the user selects a topic via the user interface. This action may be performed by selecting from a list provided via an application at the user device, for example where an email application provides a dropdown menu of topics for the user to select to 'focus' on. The user may also select a time period over which the 'focus' period is active, which defines the time period during which the filtering should be applied. In one example, the user selects a topic by creating a calendar event, wherein the topic of the event can be selected as a field when creating the event, along with a time, and an option to turn on a 'focus' mode, so as to filter all data unrelated to the selected topic for the duration of the created calendar event.

The selected topic is provided to the filtering system 700 which identifies the provided topic within the knowledge base 406 and determines the relevant data relating to that topic within the knowledge base. Data held within the knowledge base and identified as related to the specified topic can be incorporated into an output data structure to be provided to the user interface. In the example mentioned above, wherein a user creates a calendar event relating to a given topic, for example a project 'Project Alpha', the filtering system identifies properties, including entities of the project in the knowledge base, such as documents, users, tasks and events, relating to that topic and uses those entities to populate an output data structure which can be presented in an interface of the user application in which the event is created, allowing the user to interact with different entities related to the selected topic without needing to search for them directly. The presentation of this output is described in more detail below, with reference to FIG. 6. Thus, in addition to filtering incoming events, the filtering system 700 can be used to tailor the data already present within the knowledge base for display to the user based on the selected topic.

As well as data which is explicitly linked to the topic entity in the knowledge base 406 as properties of the topic, a trained machine learning model may be applied to determine if any existing entities of the knowledge base are associated with the topic, such that they should be provided to the user interface. This model applies the same comparison described above for new trigger events received at the application such as emails and messages to compare the entities with the properties of the topic in the knowledge base and determine if an association exists between those entities and the topic. If these further entities already present in the knowledge base are determined to be associated with the topic, this can be integrated into the output data structure provided to the user interface of the application.

When new incoming data (e.g. events such as messages and emails) 402 is received, as described above, when a given topic is selected for focus, the filtering system 700 applies the same machine learning model to compare this new incoming data 402 to the properties of the entity in the knowledge base already identified as related to the selected topic. The filtering system uses a probabilistic model to determine whether the incoming data is associated with the entity of the selected topic and their respective properties. If the probability is high enough (i.e. it meets some predefined threshold as described above) it is output to the user interface 708. The new incoming data 402 may be integrated into the existing output data structure to create an updated output data structure which is then output to the user interface 708.

Figure 6:
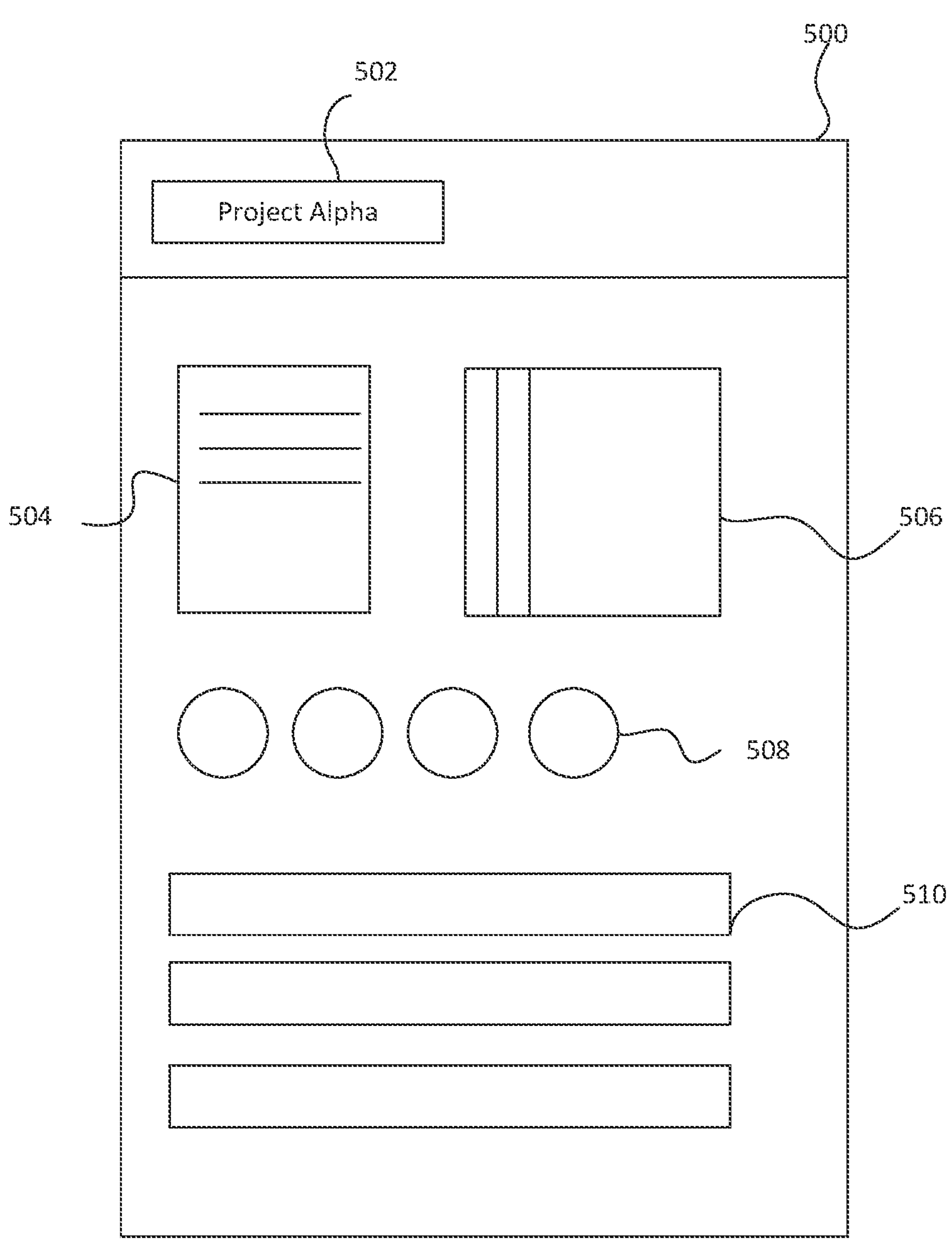
FIG. 6 is a schematic diagram of an example interface output to a user based on a selected topic.

FIG. 6 shows an example interface 500 provided to a user within an application for displaying filtered data of the knowledge base according to a selected topic. This may be implemented, for example, within an email application, in response to the user creating a calendar event and selecting a particular topic, or upon opening a document relating to a particular topic within a file editing application. The interface may be provided within a panel of the user application, or it may appear only when the user clicks on or hovers over a selected topic, for example within a created calendar event. Different applications may be configured to present different versions of the interface 500 having different data presented in each, based on the type of activity that is typically performed by the user within that application and the types of data that may be relevant to that activity. A common version of the interface 500 may also be presented in a pop-up view provided as part of all relevant applications, which may be accessed, for example, when a user hovers over a highlighted topic in the application.

The interface includes various entities identified by the filtering system 700 as relevant to the selected topic 'Project Alpha'. The topic name is provided in a name field 502. Other data relating to the topic including a current document 504, which is currently being worked on by one or more users of the network as part of the selected project, as well as a set of previous documents 506. These may be provided in the user interface as interactive components, such that the user can click on any one of the documents and open the relevant document in a word processor or collaborative file editing application to continue working on that document. In response to the user clicking an interactive component, an interface of the relevant application may be opened alongside the interface 500, for example opening a text editing application alongside the interface shown in FIG. 6. The current document 504 and previous documents 506 may be of the same document type, each represented in the knowledge base as an entity having the same type and therefore having a set of corresponding properties. This information can be taken from the knowledge base and notify the user of information that may be missing from the current document, based on the typical properties of that document type. For example, the document 504 may be an incomplete contract document, and the documents 506 may include multiple previous complete contract documents. Based on the properties of contract entities in the knowledge base and the property values present for the current document 504, suggested information, such as a signature field, or a target deadline, to be added to the contract document 504 can be displayed in the user interface along with the visualisation of the previous contract documents.

A set of users 508 associated with the selected topic, as determined based on the structured knowledge base is also displayed. This allows the user to see who is working on the related topic and access their information, contact details, messages, etc. without needing to search for them manually. These are also interactive, allowing the user to click on or hover over a user identified for the given project and to see further information on that user, such as an email address, or to open a profile for that user. This can also be used to take actions related to the content presented within the user interface according to the given topic. For example, the user can click on a related user identified as being related to the topic, where this action triggers a messaging interface to be opened within the user interface, allowing the user to message the related user directly about the topic without leaving the application, and without leaving focus mode. A messaging interface may also be triggered by clicking on an individual message that is identified as related to the topic based on the knowledge base and displayed in the interface 500, as described above. In this way, the filtering of items provided to the user via the user enables filtering of both the content itself and the actions available to the user while in focus mode according to the selected topic. Other actions that may be provided to the user via the interface 500 include editing of related documents 502 or changing the status of a task.

Further fields 510 that may be provided as part of the interactive interface include tasks or sub-projects that are identified within the selected project. These may be provided with a checkbox or other user interface control that enables the user to change the status of a given task or sub-project to indicate that it has been completed, enabling the user to update the status of a project or tasks within a project for all relevant users through a single interface. This interface can be integrated into multiple user applications, to enable the user to access the relevant data of a given topic while engaging in different activities across different applications of a connected set of applications to which the filtering system 700 has access.

While the 'focus' mode is on, i.e. during a time specified by the user for filtering based on a selected topic, the data shown to the user is limited to the data identified within the knowledge base as relevant to the selected topic and new data identified by a comparison carried out by the filtering system to be associated with that topic. If the focus mode is manually turned off, or if the time duration runs out, the filtering is no longer applied, and any new data received by the user device is displayed in the relevant applications as normal. In this case, any data which was suppressed by the filtering system during the 'focus' mode is also displayed to the user as it would appear if the filtering were not applied.

When a focus mode is activated in a given application, or across multiple applications, existing data associated with those applications can be filtered within those applications such that only data relating to the selected topic is displayed. For example, where a calendar event is defined having a specified start and end time for focus on a particular topic, the content in any relevant applications for which the specified focus mode applies is limited to content related to that topic from the start time to the end time. Multiple applications could be opened directly from the calendar event or from an interface such as interface 500 described above, by clicking on interactive components of the interface that represent documents, users, events, etc. relating to the topic according to the knowledge base.

Figure 7:
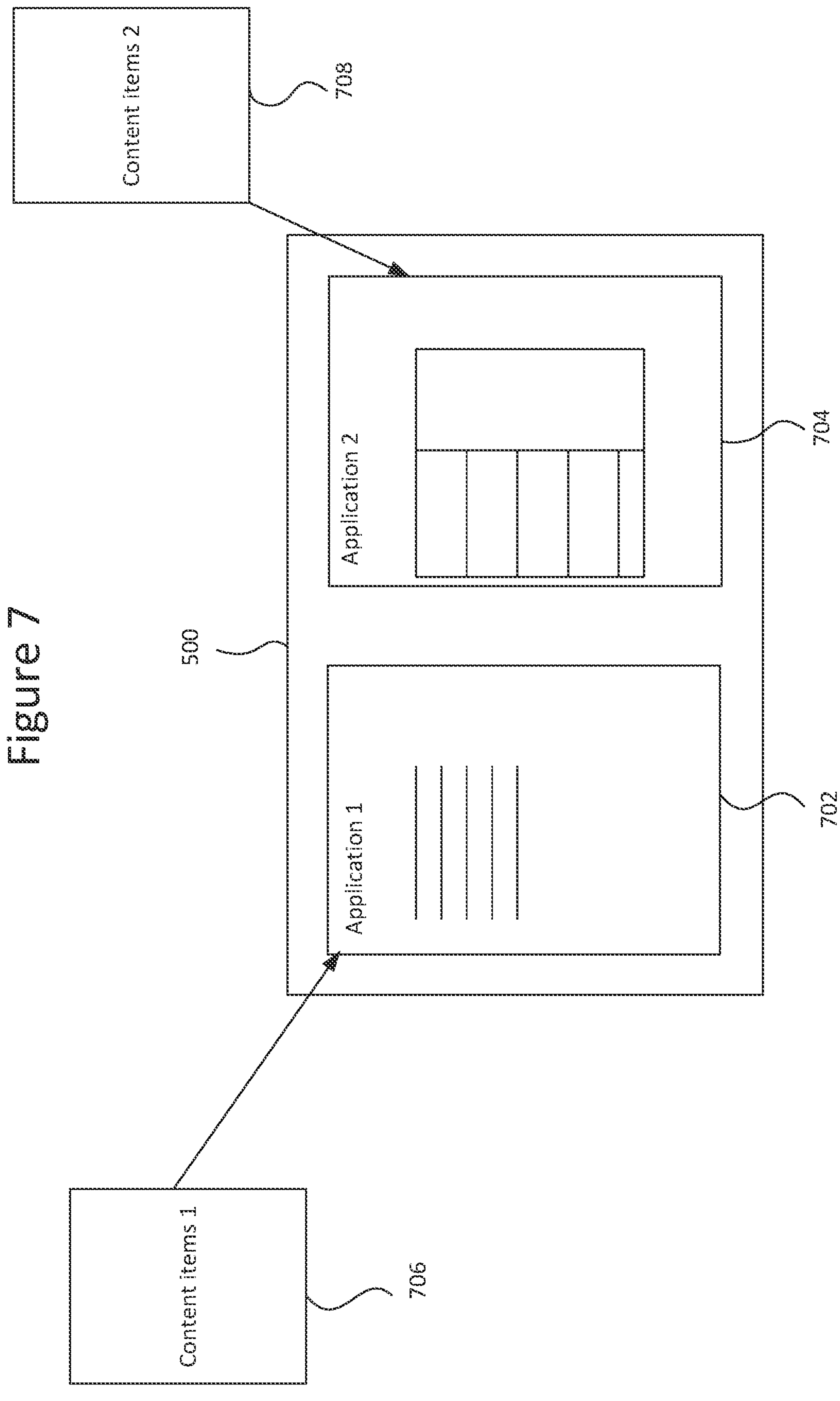
FIG. 7 is a schematic block diagram showing the filtering of content items within multiple application interfaces.

FIG. 7 shows a schematic block diagram of the filtering of content in multiple interfaces for multiple applications based on a permitted topic. FIG. 7 shows a first application interface 702 corresponding to a first application, for example a text editing application, and a second application interface 704, corresponding to a second application, such as an email application. In a normal mode of operation, each application has access to a plurality of content items that can be displayed in its corresponding interface, and which is displayed according to a user's selection. For the text editing application, for example, within a menu of the application to open existing text documents, a list of recently accessed documents may be displayed from which the user can select, opening the selected document within the text editing application. For the email application, in a normal mode of operation, a list of received emails is typically displayed in a summary view of the user's inbox within the email application interface, which is usually sorted such that most recently received emails are displayed at the top of the list.

At the start time of the focus mode (the 'focus initiation time'), the first application is configured to select content from the multiple available content items for display within it associated interface 702 according to the topic associated with the focus mode. In this case, the user can only view, edit or select documents that relate to a topic to which the focus mode relates, such as a project associated with the predefined calendar event in which the focus mode was set. At the same time, the second application is configured to select only content from the multiple available content items 708 for display in the interface 704 of the second application. The available content items for display in the email application include all emails of the user's inbox as displayed in a summary view in a normal mode of operation. This is filtered to only display a summary view of those emails that relate to the specified topic within the interface 704 while the focus mode is active. As new emails are received, these are filtered according to the method described above with reference to FIG. 2 above to determine whether to display the summary view of the new incoming email in the interface 704.

After the focus mode is deactivated, for example once the focus mode end time according to the defined calendar event has been reached or when a user manually deactivates focus mode, other content that is unrelated to the permitted topic can be displayed in both application interfaces 702, 704.

Figure 8:
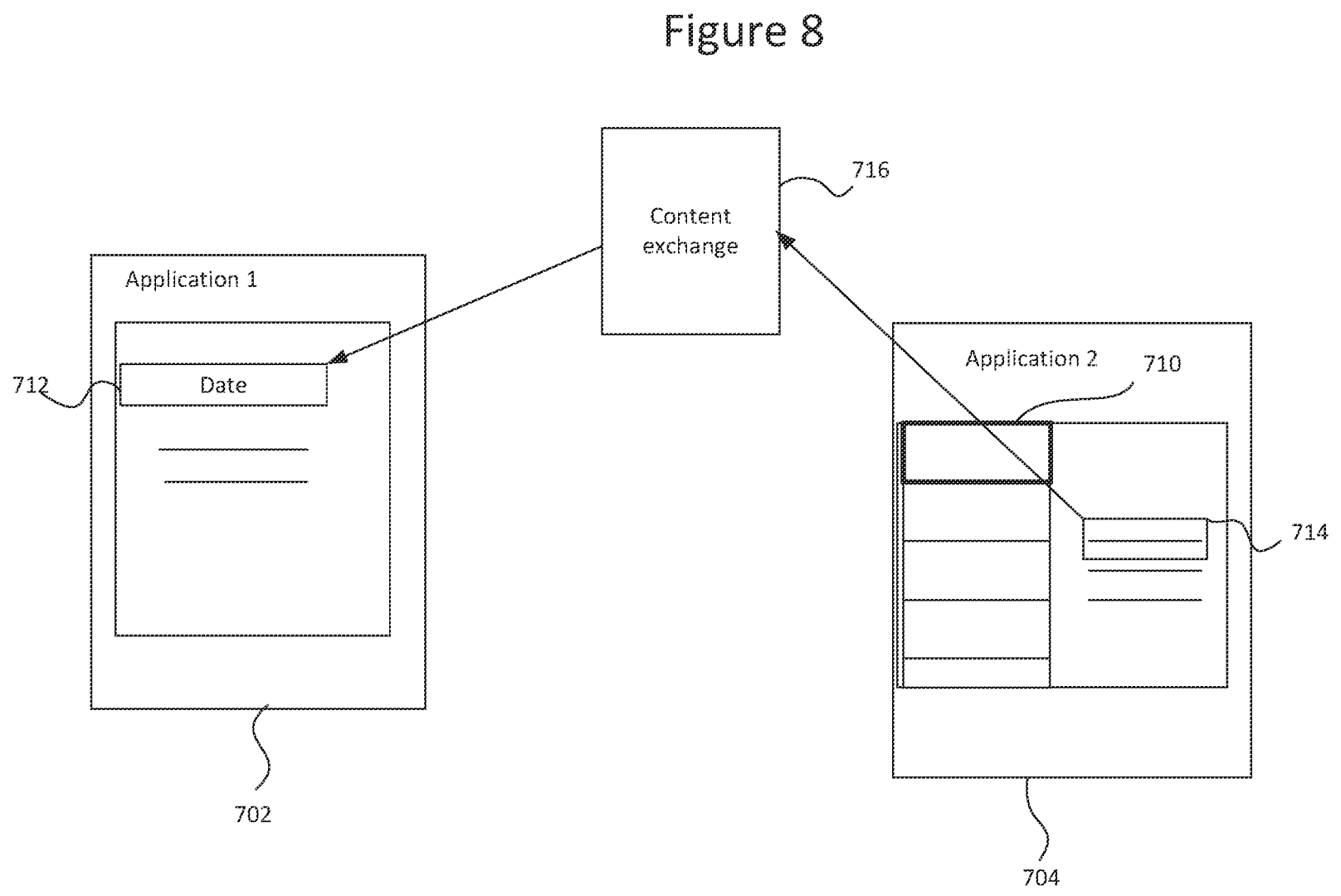

Content displayed in multiple applications, for example as shown in FIG. 7, may be analysed to identify corresponding data between the two applications. This is shown in FIG. 8. For example, within a topic specified as the project 'Project Alpha', a document relating to that project is open in a text editing application, and shown within an interface 702 of the text editing application. Within a separate email application, emails identified as relating to Project Alpha are displayed in the interface 704, while unrelated emails are suppressed from view. A new or existing email within the interface 702 of the email application may contain date that a user wishes to add to the document currently displayed in the text editing application interface 702. For example, a contract document may contain a date 712, indicated by the phrase 'dated as of', which may be out of date if more recent edits have been made to the contract, for example by another user. The required update to the contract date might be communicated to the user in the form of an email 710 from another member of the project. Since the email came from another member of the project, it relates to the topic of 'Project Alpha' and is therefore displayed in the email interface 704. The date that the user indicates as the updated contract date in the email can be identified and extracted by a content exchange component 716 and inserted into the position of the existing date of the contract as identified in the document of the text editing application.

The content exchange component 716 may take the form of a machine learning model trained to identify corresponding data fields within structured and/or unstructured text data including emails and text documents by using the context of surrounding phrases, etc to determine the property associated with a date referenced in the email, and to determine the property associated with the date referenced in the contract. When the model determines that the date in the email and the date in the contract correspond to the same property, then the model identifies that the email contains a potential updated value of the contract date property. The model determines which data from the content displayed in the two applications relate to corresponding properties, or 'fields', i.e. in both cases the model is identifying a contract date 'field', even when neither the document nor the email are structured to have an explicit 'contract date' field.

As described above, one model suitable for identifying properties of documents is the model described above with reference to FIG. 3, which identifies properties and entities from structured and/or unstructured data which can be used to build a knowledge base. This process of building and updating a knowledge base can be used to compare corresponding data values between content of different applications. Alternatively, a separately trained probabilistic model may be used to analyse content displayed within an application and compare it with existing content in another application to determine that the data is exchangeable between the two applications. Models for processing structured and unstructured text to identify data fields (properties) are known in the art. One example model that may be used to perform this content exchange automatically is GPT (Generative Pre-trained Transformer), and other types of model may be used to perform this analysis to modify content of documents automatically. The content modification determined by the content exchange component 716 may be applied directly to the document of the text editing application, or alternatively, the matched content item from one application may be presented as a suggested update to the user, for example when the user hovers over the existing date in the document of the text editing application.

As well as displaying existing data of the knowledge base related to a given topic as described above, the knowledge base can also be used to identify when data of the knowledge base is missing or out of date and notify the user if any data of the knowledge base being displayed due to its association with a selected topic needs to be updated or added. This feature can be implemented when focus mode is active, but is applied independently of the content filtering methods described above.

It can be determined that certain properties are missing from a topic of the knowledge base based on the properties present for other topics within the knowledge base of the same type. For example, the knowledge base may contain multiple 'project' topics, e.g. Project Alpha, Project Beta, etc. As described above, entities and properties for each topic are extracted based on available data and the knowledge base entities and properties are built. As part of this process, a set of properties can be identified that are associated with a given topic type. For example, for a project topic, the property 'project lead' may be identified in most instances, leading the model to determine that projects should have a property 'project lead'. In this case, it may be determined by the computer system that builds and updates the knowledge base when a given project topic is missing a 'project lead' property. The system can output a suggestion via a user interface of an application associated with the given project to prompt the user to input the missing data. This may be applied within focus mode, for example by providing the suggestion as an element of the interface 500 that includes relevant data of the topic selected for focus by the user. Alternatively, it may be provided via an interface of any application with which the missing data is associated, even when focus mode is not activated. For example, where a user opens a file relating to Project Alpha within a word processing application, and the project lead is not identified within that application, where 'project lead' is identified as a property of that type of file, a notification may be displayed to the user suggesting that a project lead is missing from the document. A similar process may be applied to notify the user of out-of-date data within user applications, as described in more detail below.

Figure 9:
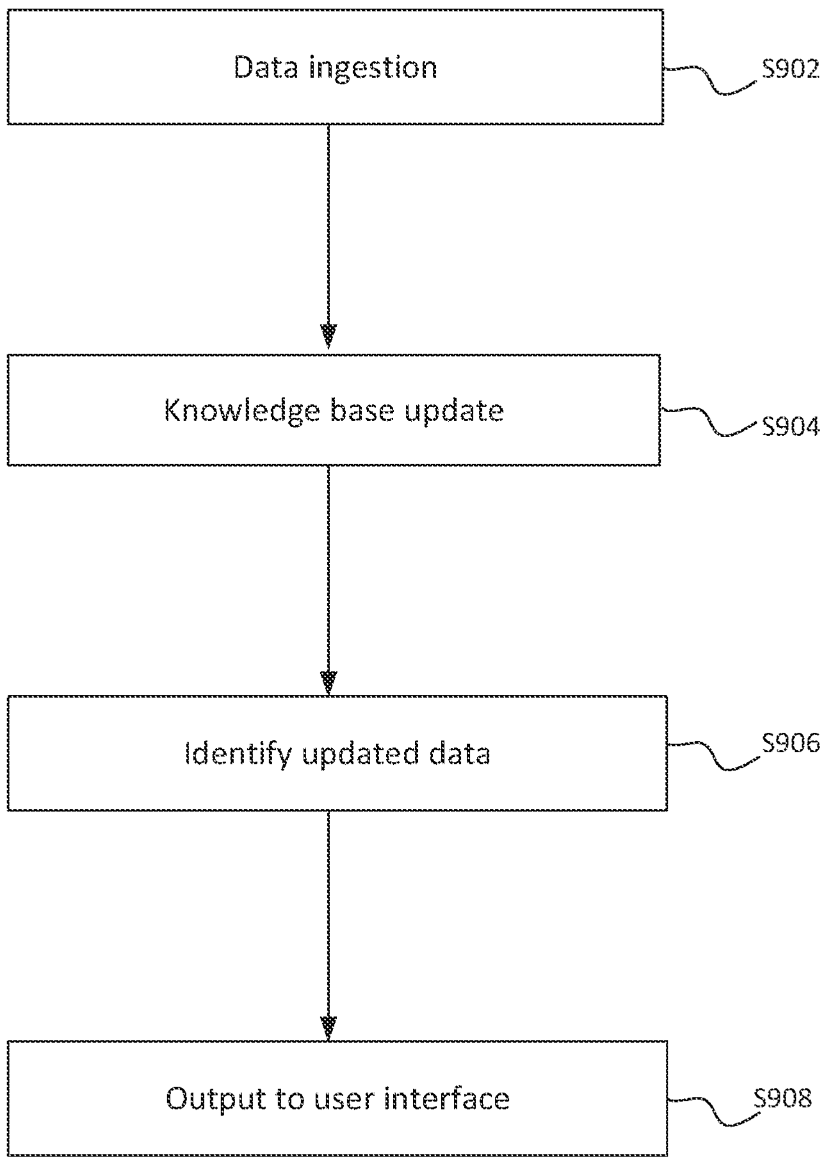
FIG. 9 is a flow chart of a method for automatically updating the content provided to a user interface based on knowledge base updates.

FIG. 9 is a schematic block diagram showing how a knowledge base is updated in response to newly received data and the updated data output to the user interface. The step of updating the knowledge base may be performed at regular time intervals, for example the knowledge base may be updated on a daily or hourly basis, based on new data received by the system, or newly received data may be continually added to the knowledge base as it is received. The process of updating the knowledge base is described above, with reference to FIG. 3. The data is ingested at step S902, corresponding to the data ingestion step S202 of FIG. 3. The new data ingested could include trigger events as described above, such as new emails or messages received by an email or messaging application, which are processed to extract information from the events to be added to the knowledge base, or from other data sources that are added to the existing data of the knowledge base, such as web sources, enterprise network resources, etc. As described in FIG. 3, this data is processed to extract snippets of information, which are further parsed and processed to determine structured entities of the knowledge base or to merge with existing entities. The knowledge base update step S904 shown in FIG. 9 comprises the steps S204-S210 shown in FIG. 3, where extracts are created from the ingested data, before parsing to create entity instances and linking to resolve duplicate data into the same entities in a knowledge base, before adding these to the existing knowledge base.

When the new data is incorporated into the knowledge base, properties of existing entities of the knowledge base may be updated based on the new data. For example, where a 'meeting' entity exists in the knowledge base, and the data ingested at step S902 includes an updated calendar event having a different list of invitees, with the sub-steps of the knowledge base update S904 determining that the new calendar event relates to the existing meeting entity of the knowledge base. In this case, the meeting entity of the knowledge base is updated to account for the new list of invitees. This process may take into account metadata relating to the newly received data, such as a time that the updated calendar event was created, to determine that it should be used to update the existing properties of the meeting, where an update is only applied if the new data was created after the time that the original meeting entity was created.

Once the knowledge base is updated to account for new property values that may be extracted from new data, this can be used to modify the content output to the user interface, or to notify users that the content of the user interface may be out of date. The process of updating content of the user interface may be performed automatically, for example at regular time intervals, the content of the knowledge base may be compared with the corresponding content displayed in the user interface, and where a discrepancy between a property of the knowledge base and a corresponding piece of data in the user interface is discovered, this is notified to the user, or the updated knowledge base data is automatically output to the user interface. Alternatively, this proves may be triggered by an action by the user. For example, when the user opens a document or an email, this may trigger the system to check the contents of the knowledge base for updates.

For relevant applications for which a focus mode is applied, the content displayed in the user interface is limited to content identified as related to the permitted topic as defined within the knowledge base. To identify the updated data of the knowledge base that needs to be incorporated into the output to the user interface (S906), the application identifies any properties of the permitted topic as represented in the knowledge base that have been updated compared with the data displayed in the user interface. As mentioned above, this step may be triggered by an action of a user (e.g. to open a relevant document) or it may be performed automatically. If any property values of the permitted topic differ from the content corresponding to the same properties presented in the user interface, an output is generated via the user interface. This could be an updated property value to replace the corresponding property value identified as out-of-date in the existing user interface output. Alternatively, the output may take the form of a notification to the user that a property being displayed in the user interface is potentially out-of-date. This notification may provide a control by which a user can select whether to manually replace the out-of-date data with the updated property of the knowledge base or to maintain the data currently being displayed.

It should be noted that this method is not limited to cases where focus mode is applied, and can be applied to content displayed in any user application for which the knowledge base provides properties for display in the user interface.

The above description relates to the modification of content in the user interface based on updates to the knowledge base. However, content of the user interface that corresponds to data of the knowledge base may also be updated directly based on new trigger events received by the application, as described for the content filtering application above. For example, where the interface displays a current calendar application with the meeting information displayed in the user interface being taken from meeting entities and associated properties of the knowledge base, and where a new email is received proposing a new time for an event within the calendar, a machine learning model can be applied to the new email to identify the data within this email that corresponds to properties of the calendar event within the knowledge base. If data within this email is determined to correspond to a property of the calendar event, this can be used to automatically update that property of the calendar event, for example by changing the start time of the calendar event.

Figure 10:
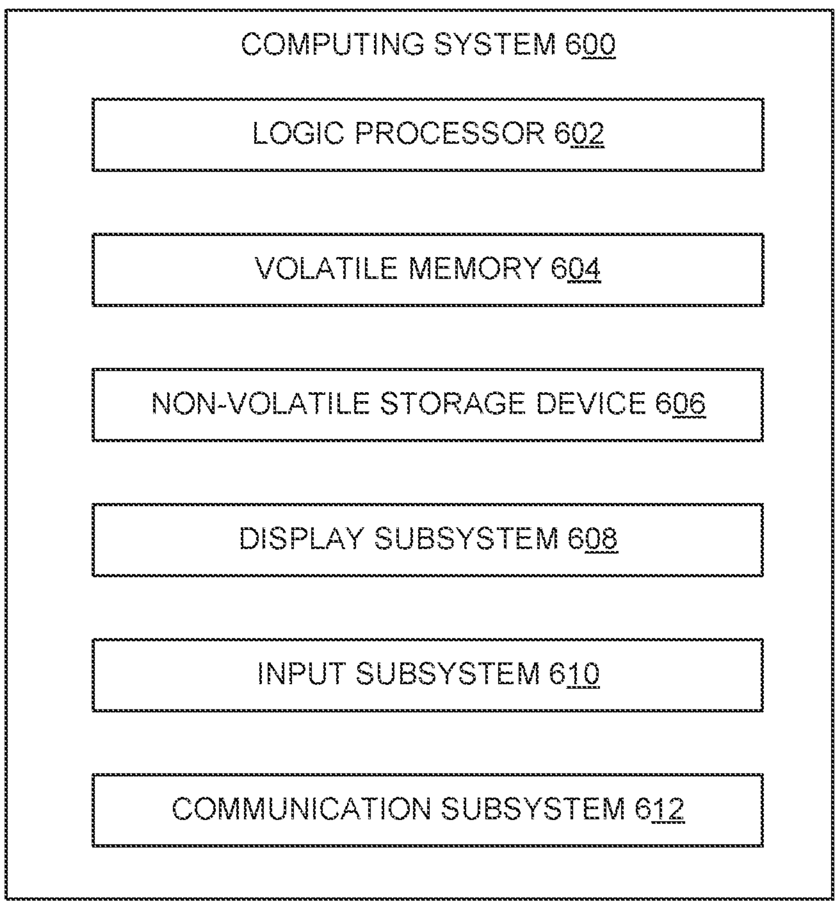
FIG. 10 is a schematic diagram showing an example computing system.

FIG. 10 schematically shows a non-limiting example of a computing system 600, such as a computing device or system of connected computing devices, that can enact one or more of the methods or processes described above, including the filtering of data and implementation of the structured knowledge base described above. Computing system 600 is shown in simplified form. Computing system 600 includes a logic processor 602, volatile memory 604, and a non-volatile storage device 606. Computing system 600 may optionally include a display subsystem 608, input subsystem 610, communication subsystem 612, and/or other components not shown in FIG. 10.

Logic processor 602 comprises one or more physical (hardware) processors configured to carry out processing operations. For example, the logic processor 602 may be configured to execute instructions that are part of one or more applications, programs, routines, libraries, objects, components, data structures, or other logical constructs. The logic processor 602 may include one or more hardware processors configured to execute software instructions based on an instruction set architecture, such as a central processing unit (CPU), graphical processing unit (GPU) or other form of accelerator processor. Additionally or alternatively, the logic processor 602 may include a hardware processor (s)) in the form of a logic circuit or firmware device configured to execute hardware-implemented logic (programmable or non-programmable) or firmware instructions. Processor(s) of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 602 may be virtualized and executed by remotely accessible, networked computing devices configured in a cloud-computing configuration. In such a case, these virtualized aspects are run on different physical logic processors of various different machines.

Non-volatile storage device 606 includes one or more physical devices configured to hold instructions executable by the logic processor 602 to implement the methods and processes described herein. When such methods and processes are implemented, the state of non-volatile storage device 606 may be transformed—e.g., to hold different data. Non-volatile storage device 606 may include physical devices that are removable and/or built-in. Non-volatile storage device 606 may include optical memory (e g., CD, DVD, HD-DVD, Blu-Ray Disc, etc.), semiconductor memory (e g., ROM, EPROM, EEPROM, FLASH memory, etc.), and/or magnetic memory (e.g., hard-disk drive), or other mass storage device technology. Non-volatile storage device 606 may include nonvolatile, dynamic, static, read/write, read-only, sequential-access, location-addressable, file-addressable, and/or content-addressable devices.

Volatile memory 604 may include one or more physical devices that include random access memory. Volatile memory 604 is typically utilized by logic processor 602 to temporarily store information during processing of software instructions.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604.

Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein-described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices. When included, input subsystem 610 may comprise or interface with one or more user-input devices such as a keyboard, mouse, touch screen, or game controller.

In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the internet.

The term computer readable media as used herein may include computer storage media. Computer storage media may include volatile and non-volatile, removable and non-removable media (e.g., volatile memory 604 or non-volatile storage 606) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 600 or a component device thereof). Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

A first aspect herein provides a computer-implemented method comprising detecting, by an application in a focussed operating mode, a trigger event; determining, using machine learning (ML) content classification applied to content associated with the trigger event, that content associated with the trigger event does not match a permitted topic associated with the focussed operating mode; and responsive to determining that the content does not match the permitted topic applicable to the focussed operating mode, suppressing, by the application in the focussed operating mode, notification of the trigger event.

The method may comprise: detecting, by the application in the focussed operating mode, a second trigger event; determining that second content associated with the second trigger event matches the permitted topic associated with the focussed operating mode; and responsive to determining that the second content matches the permitted topic, causing, by the application in the focussed operating mode, a notification of the second trigger event to be outputted via a user interface.

The ability to perform topic-based filtering of events such as incoming emails and messages provides the user with greater level of control over user interface settings to tailor the user interface according to a desired topic, such as a current project, meeting, organisation, etc. Furthermore, the suppression of notifications based on the corresponding events not matching a given topic prevents unnecessary use of computing resources which would, in a normal mode of operation, be used to output notifications for events not relevant to the given topic.

The method may further comprise detecting, by the application in the focussed operating mode, a deactivation event; responsive to the deactivation event, switching from the focussed operating mode to a second operating mode; and responsive to switching to the second operating mode, causing a second notification of the second trigger event to be outputted via the user interface.

By automatically outputting suppressed notifications to the user interface after the focussed mode has ended, this enables the user to access the information that was hidden in focus mode without having to manually search for it.

The method may further comprise receiving via the user interface user input defining the permitted topic.

The focussed operating mode of the application may be activated in response to an activation event, wherein the activation event is one of: a user-initiated activation input; an activation input received from a second application; a time-triggered activation event.

The method may further comprise activating a second focussed operating mode of a second application responsive to the activation event, wherein the permitted topic is associated with the focussed operating mode of the application and to the second focussed operating mode of the second application.

The method may further comprise determining a focus time interval; storing a first indication of the focus time interval; storing a second indication of the permitted topic in association with the first indication of the focus interval, the activation event being commencement of the focus interval; causing a calendar view to be rendered via the user interface; generating in the calendar view a visual representation of the focus interval and the permitted topic.

The method may further comprise detecting, by the application in the focussed operating mode, a deactivation event; responsive to the deactivation event, switching from the focussed operating mode to a second operating mode; detecting, by the application in the second operating mode, a third trigger event; and responsive to the third trigger event, causing, by the application in the second operating mode, a third notification of the third trigger event to be outputted via the user interface.

The permitted topic may be associated with multiple properties of a knowledge base, wherein determining that the content associated with the trigger event matches the permitted topic comprises: computing respective property association scores between the content and the multiple properties; computing, based on the respective property association scores, a topic association score between the content and the permitted topic, and determining that the topic association score meets a topic matching threshold.

By using contextual information present in a knowledge base, more accurate and robust filtering of incoming content is possible, since the incoming data can be classified as related to a specified topic based on properties which are known to be related to that topic according to the knowledge base.

The trigger event may be a detection of an incoming electronic message. This could include emails and electronic messages of a messaging application.

The notification may be caused to be outputted responsive to determining that: 1) the content matches the permitted topic, and 2) the trigger event is associated with a permitted user identity.

The method may further comprise causing, by the application in the focussed mode, content of at least one of the multiple properties of the knowledge base to be outputted to the user interface.

A second aspect herein provides a computer system comprising memory configured to hold computer-readable instructions, the computer-readable instructions comprising first instructions encoding a first application and second instructions encoding a second application; and a processor coupled to the memory, the processor configured to execute the computer-readable instructions which, when executed on the processor, cause the processor to carry out operations comprising: determining a focus initiation time; storing a first indication of the focus initiation time; storing a second indication of a permitted topic in association with the first indication of the focus initiation time; responsive to reaching the focus initiation time, activating: a first focussed operating mode of a first application, and a second focussed operating mode of a second application; selecting based on the permitted topic, from a first plurality of content items associated with the first application, a first content item matching the permitted topic; selecting based on the permitted topic, from a second plurality of content items associated with the second application, a second content item matching the permitted topic; causing a user interface to render within a first display area associated with the first application a first visual indication of the first content item; and causing a user interface to render within a second display area associated with the second application a second visual indication of the second content item.

By filtering content associated with multiple respective applications during a focus interval, the user is provided with greater control over multiple interfaces, and can switch between interfaces and applications while maintaining the topic-based control over the content displayed in each application. Two interfaces can be displayed simultaneously, corresponding to different respective applications, with only content matching the permitted topic being rendered within each interface, preventing the user from being distracted by content that is unrelated to the current focus mode.

The operations may comprise identifying that a first data value of the first content item and a second data value of the second content item are associated with a common data field; and modifying the second content item to incorporate the first data value of the first content item.

Exchanging content which has already been filtered according to topic reduces computing resources, since it avoids analysing all content items to identify matching fields, and only analyses those which are already identified as being associated with a particular topic.

The permitted topic may be associated with a topic entity of a knowledge base, wherein selecting the first content item matching the permitted topic comprises: computing a topic association score between the first content item and the topic entity, and determining that the topic association score meets a topic matching threshold; and wherein selecting the second content item matching the permitted topic comprises: computing a topic association score between the first content item and the topic entity, and determining that the topic association score meets the topic matching threshold.

The permitted topic may be associated with a topic entity of a knowledge base, wherein the first content item matching the permitted topic is selected from the properties of the topic entity; and wherein the second content item matching the permitted topic is selected from the properties of the topic entity.

The operations may comprise: detecting that the properties of the topic entity have been modified; identifying that the first content item corresponds to a property of the topic entity that has been modified; generating an updated first content item corresponding to the modified property; and causing the user interface to render within a first display area associated with the first application a first visual indication of the first content item.

The first application may, responsive to a deactivation event, cause a further first content item to be displayed within the first display region, wherein the further first content item does not match the permitted topic, wherein the second application, responsive to the deactivation, causes a further second content item to be displayed within the second display region, wherein the further second content item does not match the permitted topic.

A third aspect provides a computer-readable storage medium configured to store a first application, the first application being configured, upon execution on a processor, to cause the processor to: receiving from a second application an activation event; activate a focussed operating mode of the first application responsive to the activation event; selecting based on a permitted topic associated with the activation event, from a plurality of content items associated with the first application, a content item matching the permitted topic; and causing, by the first application in the focussed operating mode, a visual indication of the content item matching the permitted topic to be displayed via a user interface.

By enabling activation of the focus mode in a first application based on an event received from a second application, this avoids the need for the user to set the focus mode manually for each application to which focus mode is required. The user can, for example, set a focus mode within a calendar application, or a calendar interface of an email application, and other applications, such as text editing applications and file sharing applications, are configured to implement focus mode automatically.

The permitted topic may be associated with multiple properties of a knowledge base, wherein selecting the content item comprises: computing respective property association scores between the content item and the multiple properties, computing, based on the respective property association scores, a topic association score between the content item and the permitted topic, and determining that the topic association score meets a topic matching threshold.

The permitted topic may be associated with a topic entity of a knowledge base, wherein the content item matching the permitted topic is selected from the properties of the topic entity.

A fourth aspect disclosed herein provides a computer-implemented method comprising:

- receiving a first content item associated with a first application;
- identifying, using machine learning content classification applied to the first content item, a first data value of the first content item matching a data field;
- receiving a second content item associated with a second application;
- identifying second data value of the second content item matching the data field; and
- modifying the second content item to include the first data of the first content item.

The second content item may be associated with an entity of a knowledge base having multiple properties, wherein identifying the first data of the first content item comprises processing the first content item and identifying first data matching a property of the multiple properties, the property corresponding to the data field, wherein the second content item is modified by updating the property corresponding to the data field with the first data of the first content item.

The exchange of data between content items (such as text documents, emails, etc.) can be implemented independently of the focus mode described herein. Machine learning-based content classification can be applied to a first document, such as an email, to identify data matching some field, for example to identify a contract date, and a matching piece of data can be identified in a second document, such as a text document, which could have a different date but still corresponds to the same field, i.e. ‘contract date’. By matching these data fields across documents, the text document can be automatically updated with the new value for the contract date provided in the email. By providing a second content item from a knowledge base, where the data is associated with properties and entities defined within the knowledge base, a machine learning model can easily be applied to the first content item to determine whether a matching piece of data can be substituted or added to a corresponding part of the second content item, without requiring any input from a user. This can also lead to reduced processing, since the machine learning model can compare the first content item with the entity associated with the second content item, and where there is a low similarity between the first content item and the properties of the entity of the knowledge base, the first and second content items are determined not to be related, without requiring detailed analysis to determine that the individual fields present in both content items do not match.

It will be appreciated that the above embodiments have been disclosed by way of example only. Other variants or use cases may become apparent to a person skilled in the art once given the disclosure herein. The scope of the present disclosure is not limited by the above-described embodiments, but only by the accompanying claims.

The invention claimed is:

1. A computer-implemented method comprising:

- determining a focus time interval;
- storing a first indication of the focus time interval;
- storing, in association with the first indication of the focus time interval, a second indication of a permitted topic associated with a focussed operating mode of an application;
- generating, in a user interface, a visual representation of the focus time interval and the permitted topic;
- activating, responsive to commencement of the focus time interval, the focussed operating mode of the application;
- detecting, by the application in the focussed operating mode, a trigger event;
- determining, using machine learning (ML) content classification applied to content associated with the trigger event, that content associated with the trigger event does not match the permitted topic associated with the focussed operating mode; and
- responsive to determining that the content does not match the permitted topic associated with the focussed operating mode, suppressing, by the application in the focussed operating mode, notification of the trigger event.

2. The method of claim 1, further comprising:

- detecting, by the application in the focussed operating mode, a second trigger event;
- determining that second content associated with the second trigger event matches the permitted topic associated with the focussed operating mode; and
- responsive to determining that the second content matches the permitted topic, causing, by the application in the focussed operating mode, a notification of the second trigger event to be outputted via a user interface.

3. The method of claim 1, further comprising:

- detecting, by the application in the focussed operating mode, a deactivation event;

responsive to the deactivation event, switching from the focussed operating mode to a second operating mode; and responsive to switching to the second operating mode, causing the notification of the trigger event to be outputted via the user interface.

4. The method of claim 1, further comprising:

receiving via the user interface user input defining the permitted topic.

5. The method of claim 1, comprising:

activating a second focussed operating mode of a second application responsive to the commencement, wherein the permitted topic is associated with the focussed operating mode of the application and with the second focussed operating mode of the second application.

6. The method of claim 1, further comprising:

causing a calendar view to be rendered via the user interface wherein the visual representation of the focus time interval and the permitted topic are generated in the calendar view.

7. The method of claim 1, further comprising:

detecting, by the application in the focussed operating mode, a deactivation event;

responsive to the deactivation event, switching from the focussed operating mode to a second operating mode;

detecting, by the application in the second operating mode, a further trigger event; and responsive to the further trigger event, causing, by the application in the second operating mode, a notification of the further trigger event to be outputted via the user interface.

8. The method according to claim 2, wherein the permitted topic is associated with multiple properties of a knowledge base, wherein determining that the second content associated with the second trigger event matches the permitted topic comprises:

computing respective property association scores between the second content and the multiple properties;

computing, based on the respective property association scores, a topic association score between the second content and the permitted topic, and determining that the topic association score meets a topic matching threshold.

9. The method according to claim 1, wherein the notification is caused to be outputted responsive to determining that: 1) the second content matches the permitted topic, and 2) the second trigger event is associated with a permitted user identity.

10. The method according to claim 8, further comprising:

causing, by the application in the focussed operating mode, content of at least one of the multiple properties of the knowledge base to be outputted to the user interface.

11. A computer system comprising:

memory configured to hold computer-readable instructions, the computer-readable instructions comprising first instructions encoding a first application and second instructions encoding a second application; and a processor coupled to the memory, the processor configured to execute the computer-readable instructions which, when executed on the processor, cause the processor to carry out operations comprising:

determining a focus initiation time;

storing a first indication of the focus initiation time;

storing a second indication of a permitted topic in association with the first indication of the focus initiation time;

responsive to reaching the focus initiation time, activating: a first focussed operating mode of the first application, and a second focussed operating mode of the second application;

selecting based on the permitted topic, from a first plurality of content items associated with the first application, a first content item matching the permitted topic;

selecting based on the permitted topic, from a second plurality of content items associated with the second application, a second content item matching the permitted topic;

causing a user interface to render within a first display area associated with the first application a first visual indication of the first content item; and causing a user interface to render within a second display area associated with the second application a second visual indication of the second content item.

12. The computer system of claim 11, wherein the operations comprise:

identifying that a first data value of the first content item and a second data value of the second content item are associated with a common data field; and modifying the second content item to incorporate the first data value of the first content item.

13. The computer system of claim 11, wherein the permitted topic is associated with a topic entity of a knowledge base, wherein selecting the first content item matching the permitted topic comprises computing a topic association score between the first content item and the topic entity, and determining that the topic association score meets a topic matching threshold; and wherein selecting the second content item matching the permitted topic comprises computing a topic association score between the second content item and the topic entity, and determining that the topic association score meets the topic matching threshold.

14. The computer system of claim 11, wherein the permitted topic is associated with a topic entity of a knowledge base, wherein the first content item matching the permitted topic is selected from the properties of the topic entity; and wherein the second content item matching the permitted topic is selected from the properties of the topic entity.

15. The computer system of claim 14, wherein the operations comprise:

detecting that the properties of the topic entity have been modified;

identifying that the first content item corresponds to a property of the topic entity that has been modified;

generating an updated first content item corresponding to the modified property; and causing the user interface to render within a first display area associated with the first application a first visual indication of the first content item.

16. The computer system of claim 11, wherein responsive to a deactivation event:

the first application causes a further first content item to be displayed within the first display region, wherein the further first content item does not match the permitted topic, and the second application causes a further second content item to be displayed within the second display region, wherein the further second content item does not match the permitted topic.

17. A non-transitory computer-readable storage medium configured to store instructions encoding a first application and a second application, the instructions being configured, upon execution on a processor, to cause the processor to:

determine a focus initiation time;

store a first indication of the focus initiation time;

store a second indication of a permitted topic in association with the first indication of the focus initiation time;

responsive to reaching the focus initiation time, activate a focussed operating mode of a first application and a focussed operating mode of a second application;

select, based on the permitted topic, from a first plurality of content items associated with the first application, a first content item matching the permitted topic;

select, based on the permitted topic, from a second plurality of content items associated with the second application, a second content item matching the permitted topic;

cause, by the first application in the focussed operating mode, a visual indication of the first content item to be displayed via a user interface-within a first display area associated with the first application; and cause, by the second application in the focussed operating mode, a visual indication of the second content item to be displayed via the user interface within a second display area associated with the second application.

18. The non-transitory computer-readable storage medium of claim 17, wherein the permitted topic is associated with multiple properties of a knowledge base, wherein selecting the first and second content items comprises:

computing respective property association scores between the first and second content items and the multiple properties, computing, based on the respective property association scores, respective first and second topic association scores between the first and second content items and the permitted topic, and determining that the first and second topic association scores meet a topic matching threshold.

19. The non-transitory computer-readable storage medium of claim 18, wherein the permitted topic is associated with a topic entity of a knowledge base, wherein the first and second content items matching the permitted topic are selected from properties of the topic entity.

* * * * *